Sept. 20, 1971

E. T. BOHM
3,605,828
PILOT BOTTLING AND CANNING UNIT

Original Filed Aug. 14, 1967

Inventor:
Emanuel T. Bohm
By James L. Bailey Atty.

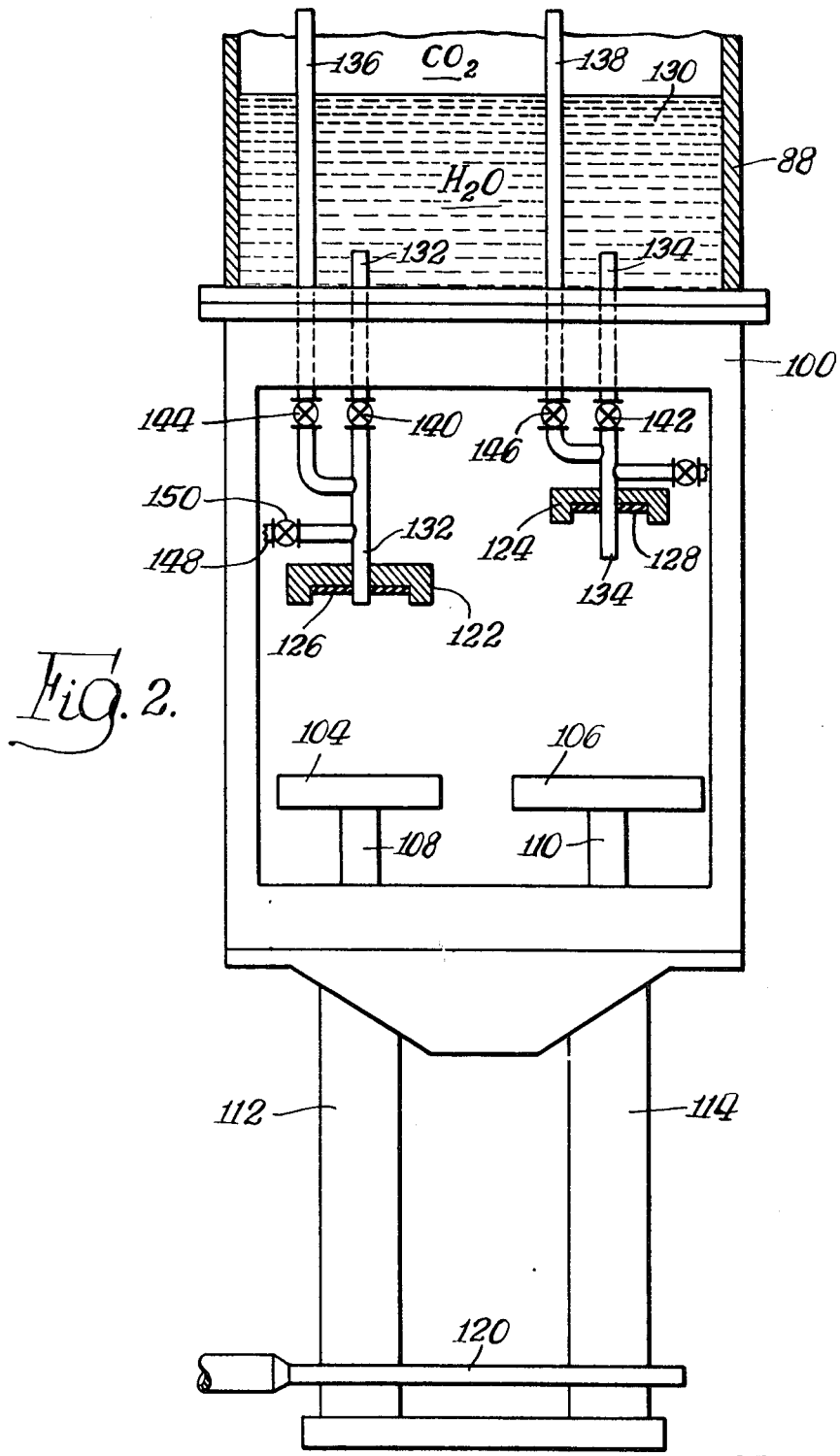

United States Patent Office 3,605,828
Patented Sept. 20, 1971

3,605,828
PILOT BOTTLING AND CANNING UNIT
Emanuel T. Bohm, New York, N.Y., assignor to
CPC International Inc.
Continuation of application Ser. No. 660,293, Aug. 14,
1967. This application Apr. 1, 1970, Ser. No. 22,130
Int. Cl. C02d 1/00
U.S. Cl. 141—69                                    8 Claims

ABSTRACT OF THE DISCLOSURE

A pilot unit for bottling and canning small quantities of soft drink beverages, whereby ingredients can be mixed under controlled conditions to permit testing of the results of ingredient variations. The unit includes means for preparing and storing the water to be used, provides means for carbonating the water, and permits packaging of the beverage in a carbon dioxide atmosphere, whereby specified manufacturing conditions can be duplicated, or varied, as desired.

---

The present invention relates, in general, to a method and apparatus for canning or bottling small quantities of beverages such as soft drinks, and is a continuation of prior copending application Ser. No. 660,293, filed Aug. 14, 1967, and now abandoned. More particularly, the invention relates to a miniaturized production line which permits the manufacture of small quantities of soft drinks under carefully controlled conditions, whereby the performance of sweeteners and the effect of ingredient changes on flavor and shelf life can be evaluated under uniform conditions.

No similar semi-automatic, hand-operated bottling and canning unit exists today. At the present time, if study and evaluation of soft drinks is needed, manufacturers must either make up preparations by hand, or must utilize production run bottles. In either event, the chances for variations in the ingredients are relatively high and true comparison tests are difficult to obtain.

Even with the strict bottling line quality control now in effect in most bottling plants, minute variations in solids, acidity, flavor ingredients and carbonation prevent the uniformity that is required for comparison testing. If, on the other hand, a small quantity of flavor syrup or sweetener is to be made up by hand, great difficulty is encountered in maintaining constant the ingredients that are not being purposely varied. Use of the regular production line does not insure complete uniformity of the other "constant" ingredients, and thus does not solve this problem. In addition, its use creates another difficulty, for insofar as the manufacturing process is concerned, it requires effective shut-down of the line while the test is being made.

In the manufacture of beverages such as soft drinks, very subtle differences in flavor can make a great difference in the commercial value of the product, and it is, therefore, important that the manufacturer be able to test and evaluate the effect of changes in the various ingredients. Not only must the tests include the effect of single ingredient changes, but also must encompass the effect of different sugar blends in the various flavors and the sensitivity of the flavors to additives or to metallic pick-up and odor from containers. Other properties that are of interest to the manufacturer are bottle shelf life, including the effects of temperature and light on the beverage over a period of time, and the stability of the bottler's flavor concentrates.

In order to evaluate the foregoing factors, the effects on beverage quality of under and over-cahbonization, $CO_2$ retention properties, vitamin C stability, the presence of air in the bottle and its effect on shelf life, factors causing ring or film formation, and the effects of flash pasteurization on finished syrups and finished beverages must be studied. Additionally, studies must be made on the effect of crown or lid leakage, off-odor and off-taste, soaker solution residues from bottle cleaning, bacterial, yeast or mold contamination, and of packaging materials on beverage quality.

The present invention provides a pilot unit capable of quickly producing small quantities of soft drinks under conditions that are more highly controlled than the usual production line conditions, and which provide more uniform results than is possible by hand-mixing, thereby overcoming the difficulties of the prior art. The manufacturing steps of water treatment, de-aeration, cooling, carbonation, filling and capping are provided in a space of less than 160 square feet, thus miniaturizing and closely duplicating the steps of a production line, while providing more critical control than can be obtained in volume production. In this manner, the required quantities of test samples can quickly and easily be prepared, with great uniformity under known conditions.

Briefly, the pilot unit comprises a water treatment tank in which impurities are removed from the water. The treated water is filtered and de-aerated, then fed to a heat exchanger where it is cooled. After carbonation, the water is fed to a filler unit which includes two filler assemblies—one for bottles and one for cans. The filler assemblies are connected to the containers by vent tubes. Bottling or canning begins by displacing the container's air with gas from a $CO_2$ bleeding system. Syrup is then added, and the container is hermetically sealed against its vent tube seat. $CO_2$ under pressure then flows from the filler unit to the container, and carbonated water from the filler unit fills the container. Excess $CO_2$ is released from the container, and the bottle or can is released from the vent tube seat for crowning or seaming on a commercial hand-sealing machine.

BRIEF DESCRIPTION OF THE DRAWING

The foregoing and additional features and advantages of the present invention will be evident to those skilled in the art from the following description of a preferred embodiment, taken in conjunction with the accompanying drawings, in which:

FIG. 2 is a diagrammatic illustration of the filler unit which comprises a part of the pilot unit of FIG. 1.

DESCRIPTION OF THE PREFERRED EMBODIMENT

Figure 1:
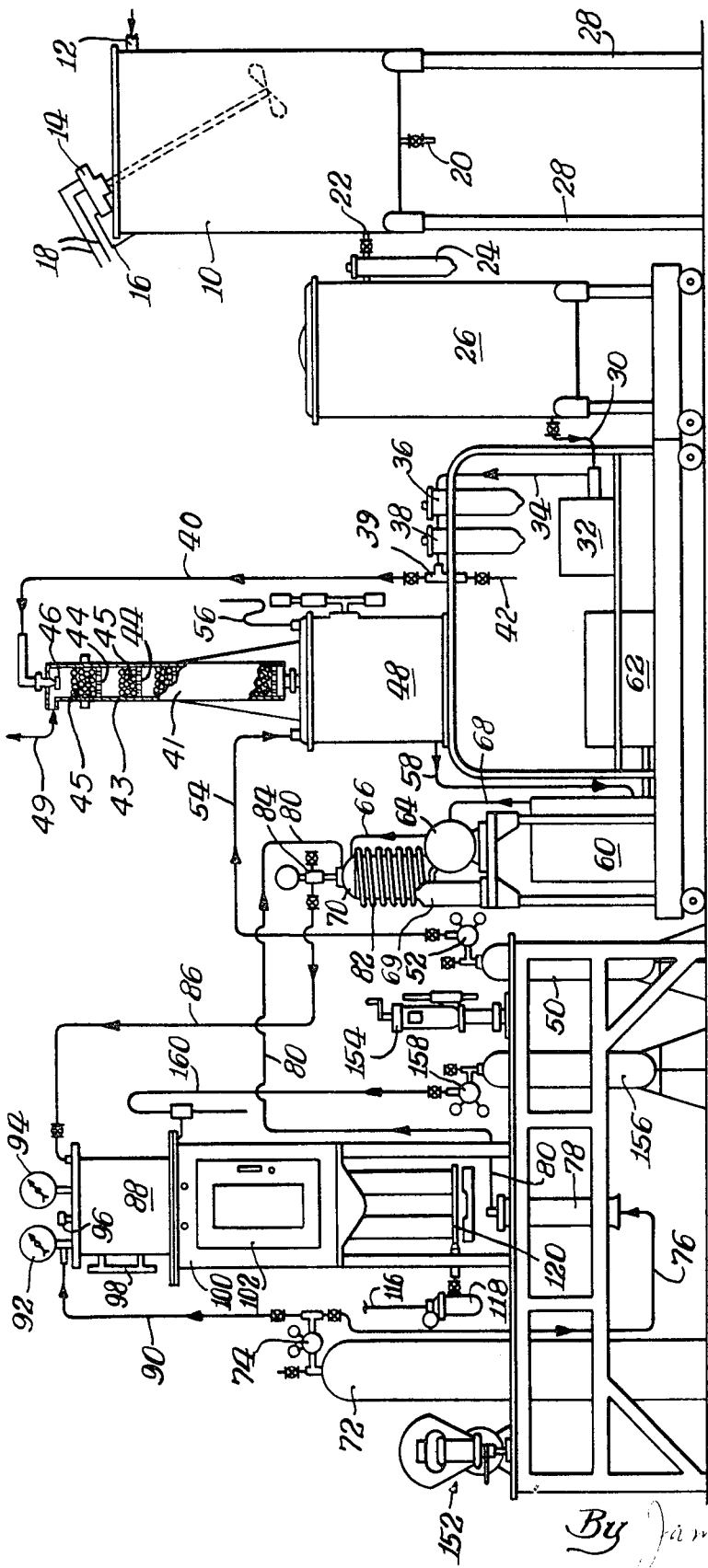
FIG. 1 is a diagrammatic illustration of a pilot bottling and canning unit in accordance with the present invention.

Referring now to FIG. 1 of the drawings, which illustrates the complete pilot unit, there is shown at 10 a water treatment tank which is used to treat the water used in the preparation of beverages. An inlet 12 introduces water from a suitable local supply of water. Chemical treatment of the local water removes the impurities and produces a more uniform starting point for the pilot plant, eliminating differences in flavor which may be caused by water impurities encountered in different locations. Preferably the water treatment tank is of stainless steel. and contains sufficient water for a full day's run. The tank has a pitched bottom to collect sediment coagulated out of the water by means of alum or other conventional coagulants. Generally a 2½ to 3 hour settling time is employed.

An agitating means such as mixer 14 may be mounted, as by bracket 16, on the water treatment tank 10, the mixer being operated by suitable control means (not shown) by way of wires 18. A valve-controlled drainage tube 20 is located at the bottom of tank 10 to permit removal of collected sediment.

At the end of the settling time, the supernatant liquid is drawn out of the treatment tank through valved line 22 and, after passing through a ceramic filter 24, which may contain magnesium oxide, flows into a holding tank 26. This purified water may be pumped into the holding tank, or, if the treatment tank is located above the holding tank, water transfer may be accomplished by gravity flow. In the illustrated system, tank 10 is mounted on legs 28 so that gravity carries the water to holding tank 26.

The compact water treatment and storage system thus far described has many advantages over the rigid automatic batch treatment systems used in conventional manufacturing methods. The primary advantage lies in its flexibility, which allows the water treatment to be varied not only with the water being used, but in accordance with the needs of the particular testing project. The cartridge-loaded ceramic filter is easy to change, and thus eliminates the complex maintenance of conventionally-used filters.

Upon demand, the chemically-treated water is drawn from holding tank 26 through valved line 30 by means of a suitable pump 32, and is directed by way of line 34 through a cotton filter 36 and an activated carbon filter 38. The two filters further purify the water, the activated carbon being specifically utilized to remove chlorine.

After filtration, the water is pumped through junction 39 and line 40 to the input of a de-aerator 41. Junction 39 may be provided with a valved drainage line 42 for use in flushing out the filters or in draining water from the system.

De-aerator 41 comprises a stainles steel tube 43 containing a series of perforated plates 44 which hold a suitable aggregate material such as a marble supply 45. The water enters the tube through a spray nozzle 46, and runs down over the marbles and through a perforated plate into a water storage tank 48. A vacuum is pulled in the de-aerator by way of line 49, removing air and carbon dioxide from the water with an efficiency of $\pm 0.4$ p.p.m. air content. Air in the water storage tank 48 is replaced by low-pressure carbon dioxide, the $CO_2$ being drawn up through the de-aerator 41 by the vacuum pump to replace the air in that unit as well.

This simple spray nozzle de-aerator system effectively replaces the complex, high-vacuum system used in production lines, which systems often are very difficult to control. Further, by connecting the de-aerator and the storage tank in the above manner, the water in the storage tank is constantly covered with carbon dioxide gas, whereas prior systems had stored the processed water in open storage tanks.

To further aid in the removal of air from the stored water in tank 48, carbon dioxide from a low-pressure storage tank 50 is supplied through a conventional pressure regulator 52 and a gas supply hose 54 to the storage tank 48, where the $CO_2$ gas is bubbled through the water stored therein. A $CO_2$ outlet 56 insures a constant gas pressure in tank 48. An electromagnetic level control switch in the storage tank actuates pump 32 whenever the water level drops below a predetermined level, thus maintaining a constant head in tank 48.

In order to aid in the evaluation of the final product, the processed water supply may be analyzed in conventional ways for pH, alkalinity, hardness, chlorine, iron, copper, bacteria content, dissolved air and oxygen, odor, turbidity, appearance and taste. These factors all affect the final beverage, and thus are of interest to the evaluator.

As the processed water is used, it is fed by gravity through line 58 to a heat exchanger which consists of units 60 and 62. The heat exchanger utilizes compressed air to cool the water to a temperature in the range of 33° to 40° F., preferably to 33° or 34°. Water is pumped by means of pump 64 from the heat exchanger through a strainer 69 and then through lines 66 and 68 to a carbonator 70. Within carbonator 70, the processed water is further carbonated by mixing it with double-filtered $CO_2$ gas under a higher pressure than was used with the previous carbon dioxide addition in storage tank 48. The carbon dioxide is supplied from tank 72 by way of pressure regulator 74, gas supply hose 76, $CO_2$ filter means 78, and gas supply hose 80 at a pressure of between 40 and 85 p.s.i.

The carbonator is provided with external cooling coils 82 in which is circulated plain cold water from the heat exchanger 60–62. The cooling coils maintain the carbonator at about 35° F. Under these conditions, the treated water in the carbonator is able to absorb up to five volumes of $CO_2$.

Water from carbonator 70 is fed through pressure regulator 84 and line 86 to a filler bowl 88 which has been pre-pressurized with carbon dioxide to create a head pressure of 25–40 p.s.i. This carbon dioxide is obtained from $CO_2$ tank 72 by way of pressure regulator 74 and gas supply hose 90. The filler bowl 88 is provided with a $CO_2$ pressure gauge 92, a thermometer 94, a bleeder valve 96 and a water level indicator 98. The water level in the filler may be controlled either automatically or manually.

Approximately one-half of the volume of filler bowl 88 is taken up with carbonated water, the remainder being filled with $CO_2$. The temperature is controlled, and a constant flow of carbon dioxide is maintained to flush out any air that might be present. The pressure in the filler bowl must be maintained in balance with the pressure within the carbonator in order to get the desired $CO_2$ volume in filler bowl 88.

Immediately below the filler bowl, and attached thereto, is a bottle and can filling cabinet 100, illustrated in greater detail in FIG. 2 of the drawings. Cabinet 100 is adapted for filling both bottles and cans with carbonated water in the preparation of beverages, two separate filler assemblies being provided for this purpose. A door 102 provides access to the cabinet; FIG. 2 illustrates the cabinet with the door removed.

Within cabinet 100 are located two stirrup shoe assemblies 104 and 106 which are mounted on corresponding piston assemblies 108 and 110. The stirrup shoes may be flat, grooved platforms which cooperate with bottle and can gripper means (not shown) to hold the bottle or can in place on the shoe assemblies. Piston assemblies 108 and 110 extend into cylinders 112 and 114, respectively, where they are driven by compressed air to move the shoe assemblies 104 and 106. Cylinders 112 and 114 are affixed to the under side of cabinet 100, and are arranged to drivingly support the piston assemblies.

Compressed air from a convenient source (not shown) is supplied by way of gas supply pipe 116 (FIG. 1) to an air intake storage unit 118. Upon initiation of a can or bottle filling operation, air at approximately 26 p.s.i. is released from the storage unit through pipe 120 to the appropriate one of cylinders 112 and 114, so that the selected piston pushes the bottle or can upwardly toward associated vent tube seats 122 or 124, respectively. As illustrated in FIG. 2, piston assembly 108 is adapted to receive beverage cans, which are normally shorter than bottles, while piston assembly 110 receives bottles.

Vent tube seat 122 is adapted to receive the open top of the container carried by platform 104, and is provided with a sealing means 126 which hermetically seals the container when pressure is applied to the platform by the compressed air cylinder 112. In a similar manner, vent tube seat 124 is provided with a sealing means 128 for hermetically closing the container carried by platform 110. The sealing means for these vent tube seats may be of neoprene, or some other suitable material. Each vent tube seat is provided with a vent tube which extends up into the carbonated water 130 contained in the filler bowl 88, vent tube 132 extending from the can filling seat 122 and vent tube 134 extending from bottle filling seat 124. As the piston assemblies push the containers into place and seal off their openings, the lower end of vent tube 132 is admitted into the can and the lower end of vent tube 134 is admitted into the bottle. The two tubes enter their respective containers to different depths, since the head space for a can is less than that for a bottle. The depth of each vent tube serves to regulate the depth to which the carbonated water fills the bottle or can, for when the water level reaches the vent tube, the pressure is equalized between the filler assembly and the bottle or can, and the flow of liquid is automatically terminated.

Bottling or canning begins by displacing the containers' air with gas from a low-pressure $CO_2$ source. The flavored, finished syrup to be used in the test is then thrown into the container, for example, from a specially designed syruper which permits small quantities of syrup to be mixed to specification. The can or bottle is centered on the platform of its proper pressure cylinder, which then moves upwardly, propelled by compressed air, to hermetically close the top of the container against the vent tube seat.

Extending from the vent tubes 132 and 134 are two gas tubes 136 and 138, respectively, which gas tubes extend into the filler bowl 88 to a point above the level of water 130. Valve means 140 and 142 are included in vent tubes 132 and 134, respectively, while valve means 144 and 146 are interposed in gas tubes 136 and 138, respectively. These valves may be of any suitable type, and may be located either in the cabinet 100 or the filler bowl 88. Control means are provided for the valves, but for purposes of simplicity of illustration, are not shown here. Any conventional control, either manually or electrically operated, may be used, and may be mounted at any convenient place on the apparatus. For example, the valves could be manually operated by valve wheels mounted on the outside of cabinet 100, or could be solenoid operated by electrical switches similarly mounted on the exterior surface of cabinet 100.

To initiate the filling operation, assuming, for example, that a can mounted on platform 104 is to be filled, valve 144 is opened and high pressure carbon dioxide is introduced into the can through gas tube 136. Valve 144 is closed, and any air in the can is then bled out by means of a bleeder vent 148 having a control valve 150, the bleeder vent being connected to vent tube 132 at a point close to the vent tube seat 122. Thereafter, liquid is introduced by gravity flow from filler bowl 88 through vent tube 132 to the can. When the can is filled, the liquid flow automatically ceases, by reason of the pressure equalization between the filler assembly and the contents of the bottle. The valve 140 is then closed, and excess carbon dioxide which has accumulated during the filling operation is released from the head space of the container. This is done before the can is exposed to the atmosphere, and preferably is accomplished by short, repeated openings of valve 150. This valve may be spring-biased closed, and may be provided with a control button which is pressed to release the $CO_2$.

The can is disengaged from the vent tube seat 122 by releasing the pressure in cylidner 112, platform 104 then returning to its rest position. The can is then removed from the cabinet for sealing in a commercial canning unit 152, shown diagrammatically in FIG. 1.

Filling of a bottle is accomplished by following the above sequence of steps, with the use of bottling platform 106, the vent tube seat 124, and the vent tubes associated therewith. Upon completion of the bottle-filling operation, the bottle is capped in a commercial hand-operated crowning unit 154 (FIG. 1).

The bottle and can filling cabinet 100 may be provided with a source of compressed air 156. This air may be fed through a pressure regulator 158 and a gas line 160 to the cabinet 100 for replacing a $CO_2$ atmosphere within the cabinet with air, if desired.

It is noted that the various pieces of equipment used in the present system are illustrated as being mounted on various tables and movable platforms. These supports are merely illustrative of one way in which the equipment can be mounted to provide a compact beverage manufacturing pilot plant, and are not to be taken as representative of a required arrangement of the parts. Some of the equipment is shown on a movable platform, and it will be apparent that, if desired, all of the equipment may be so arranged to provide easy portability.

Thus there has been provided a system by which rigidly controlled experiments and tests may be performed on soft drink beverages, permitting careful analysis and evaluation of the effects which various ingredient changes have on the final product. For example, use of this system has made is possible to obtain scientifically precise data in sucrose/dextrose sweetener studies. Although this combined sweetener has been known in the industry for some years, no extensive, rigidly-controlled trials could be conducted on its flavor-enhancement properties until the present unit was developed.

As a result of such tests, it was found that the sucrose/dextrose blends exhibit non-masking, pleasant sweetness even with high proportions of sweetener solids. Tests conducted with 90/10, 82/20, 70/30 and 60/40 sucrose/dextrose ratios have established higher acceptability as dextrose percentage increases, with the optimum ratio being 60/40. This ratio yields highest flavor, top-note-aroma, livelier flavor distribution, pleasant mouth feel, and longer shelf life. The present system will permit further experimentation along these lines to establish what happens to components which affect sweetness, flavor and keeping qualities, as well as other tests and experiments as indicated hereinabove.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

This invention is hereby claimed as follows:

1. In a compact pilot plant unit for manufacturing small quantities of carbonated beverages under highly controlled conditions that permit precise regulation of the composition and quality of the beverage product and evaluation of the performance and effect of ingredient changes on flavor and shelf life, a supply of water for use in the preparation of said beverages;

means including a water treatment tank, a water holding tank, and filter means for receiving and chemically purifying said water to obtain predetermined chemical and physical water properties, said filter means including a first filter connected between said treatment tank and said holding tank, and second and third filters;

de-aerator means comprising a container carrying a series of perforated plates supporting a supply of aggregate material, said de-aerator being connected to said holding tank through said second and third filters and including nozzle means for receiving purified water from said holding tank and spraying it onto said aggregate material for removing entrapped gases from the water;

a storage tank for receiving water from said de-aerator, said storage tank being located immediately below and in communication with said de-aerator through one of said perforated plates so that purified water from said holding tank will flow down through said de-aerator into said storage tank;

means for supplying carbon dioxide at low pressure to said storage tank, said carbon dioxide passing upwardly through the water in said storage tank;

vacuum means connected to said de-aerator for removing said entrapped gases and for drawing carbon dioxide from said storage tank into said de-aerator, whereby any air in said storage tank or de-aerator is replaced by carbon dioxide and the water in said storage tank is initially carbonated;

a heat exchanger for chilling said water;

a high pressure carbonator including cooling means for maintaining the temperature of water in said carbonator at the level determined by said heat exchanger unit;

means for drawing water from said storage tank and for feeding it through said heat exchanger to said high pressure carbonator where said water is exposed at a reduced temperature to high pressure carbon dioxide for further carbonating said water;

a hermetically sealable filler bowl for storing carbonated water from said carbonator, and means for supplying carbon dioxide to said filler bowl to prevent air from reaching said carbonated water and to provide a pressure head therein;

a filling cabinet for receiving beverage containers to be filled; and filler means within said cabinet and extending into said filler bowl for transferring said carbonated water to said beverage containers, whereby test samples of a beverage can be quickly and easily prepared, with a high degree of uniformity and under known conditions.

2. The pilot plant unit of claim 1, wherein said first filter comprises a ceramic filter containing magnesium oxide.

3. The pilot plant unit of claim 2, wherein said second filter contains cotton and said third filter contains activated carbon to remove chlorine.

4. The pilot plant unit of claim 3, wherein the pressure of said high pressure carbon dioxide is between about 40 and 85 pounds per square inch.

5. The pilot plant unit of claim 4, wherein the pressure of said carbon dioxide in said filler bowl is between about 25 and 40 pounds per square inch.

6. The pilot plant of claim 5, further including means for regulating the water level and means for varying the pressure of the carbon dioxide in said filler bowl.

7. The pilot plant of claim 6, wherein said heat exchanger chills said water to a temperature of between 33 and 40 degrees Fahrenheit.

8. The pilot plant of claim 7, further including pump means for feeding water from said holding tank to said de-aerator on demand.

References Cited

UNITED STATES PATENTS

| | | | |
|---|---|---|---|
| 867,553 | 10/1907 | Bradley | 261—Carb. Dig. |
| 1,243,068 | 10/1917 | Humphrey | 261—19X |
| 1,373,817 | 4/1921 | Humphrey | 261—19X |
| 1,598,787 | 9/1926 | Shields et al. | 261—Carb. Dig. |
| 2,040,806 | 5/1936 | Feigl | 210—501X |
| 2,252,313 | 8/1941 | Bostock | 261—Carb. Dig. |
| 2,435,774 | 2/1948 | Di Pietro | 261—Carb. Dig. |
| 2,792,942 | 5/1957 | Fevillet | 210—501X |
| 2,967,644 | 1/1961 | Barber et al. | 141—174X |
| 2,989,993 | 6/1961 | Osmond et al. | 141—277X |
| 3,179,133 | 4/1965 | Cherry | 141—40 |
| 3,235,089 | 2/1966 | Burroughs | 210—500X |

LAVERNE D. GEIGER, Primary Examiner

E. J. EARLS, Assistant Examiner

U.S. Cl. X.R.

141—82; 261—DIG 7